DIGITAL TO ANALOGUE SERVOSYSTEM

Original Filed June 25, 1957 2 Sheets-Sheet 1

INVENTOR.
ORRAL W. RITCHEY
BY K. W. Thomas
ATTORNEY

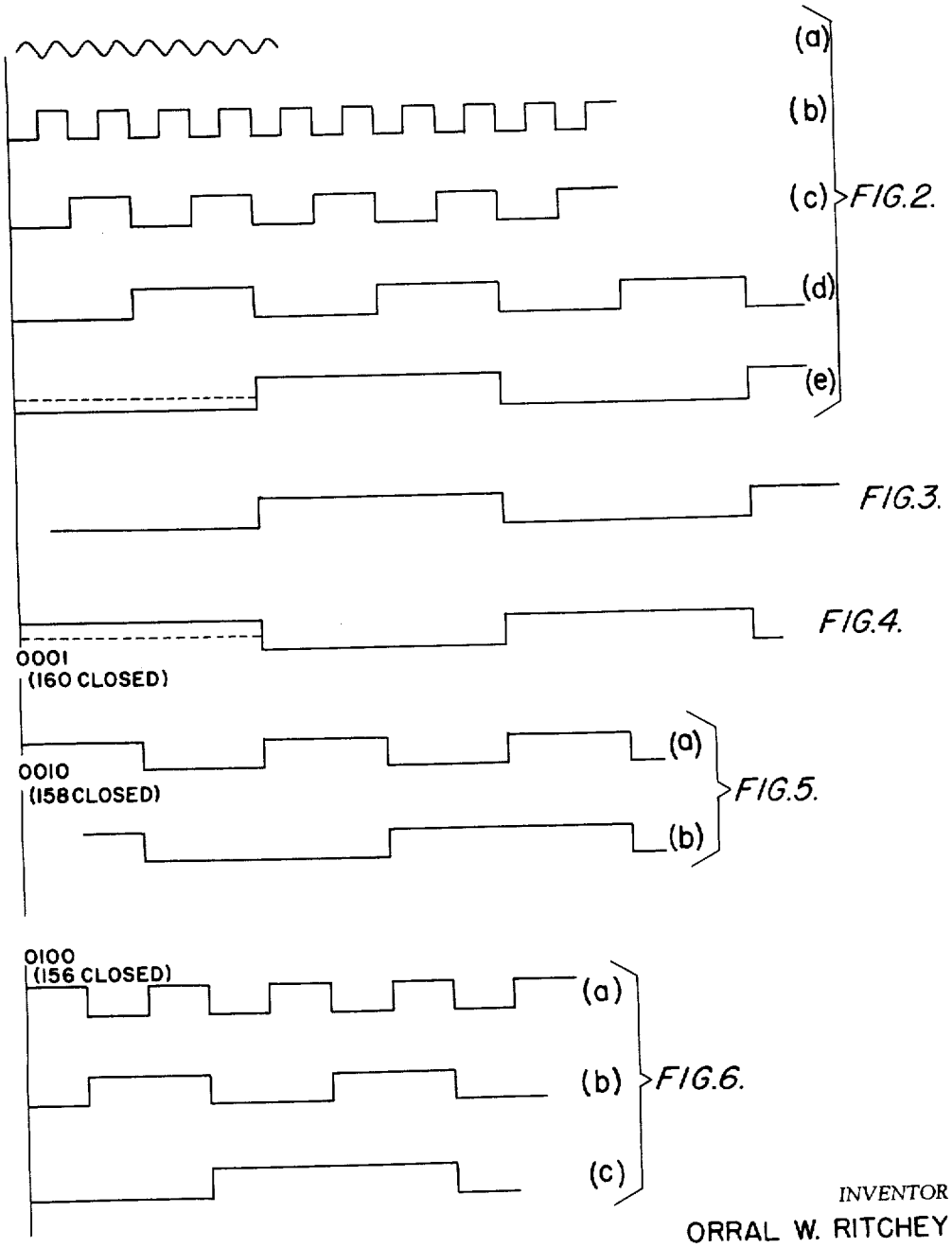
INVENTOR
ORRAL W. RITCHEY

United States Patent Office

Re. 25,509
Reissued Jan. 7, 1964

25,509
DIGITAL TO ANALOGUE SERVOSYSTEM

Orral W. Ritchey, Seattle, Wash., assignor, by mesne assignments, to Giddings and Lewis Machine Tool Company, Fond du Lac, Wis., a corporation of Wisconsin Original No. 2,943,248, dated June 28, 1960, Ser. No. 667,867, June 25, 1957. Application for reissue June 22, 1962, Ser. No. 208,663
10 Claims. (Cl. 318—23)

Figure 1:
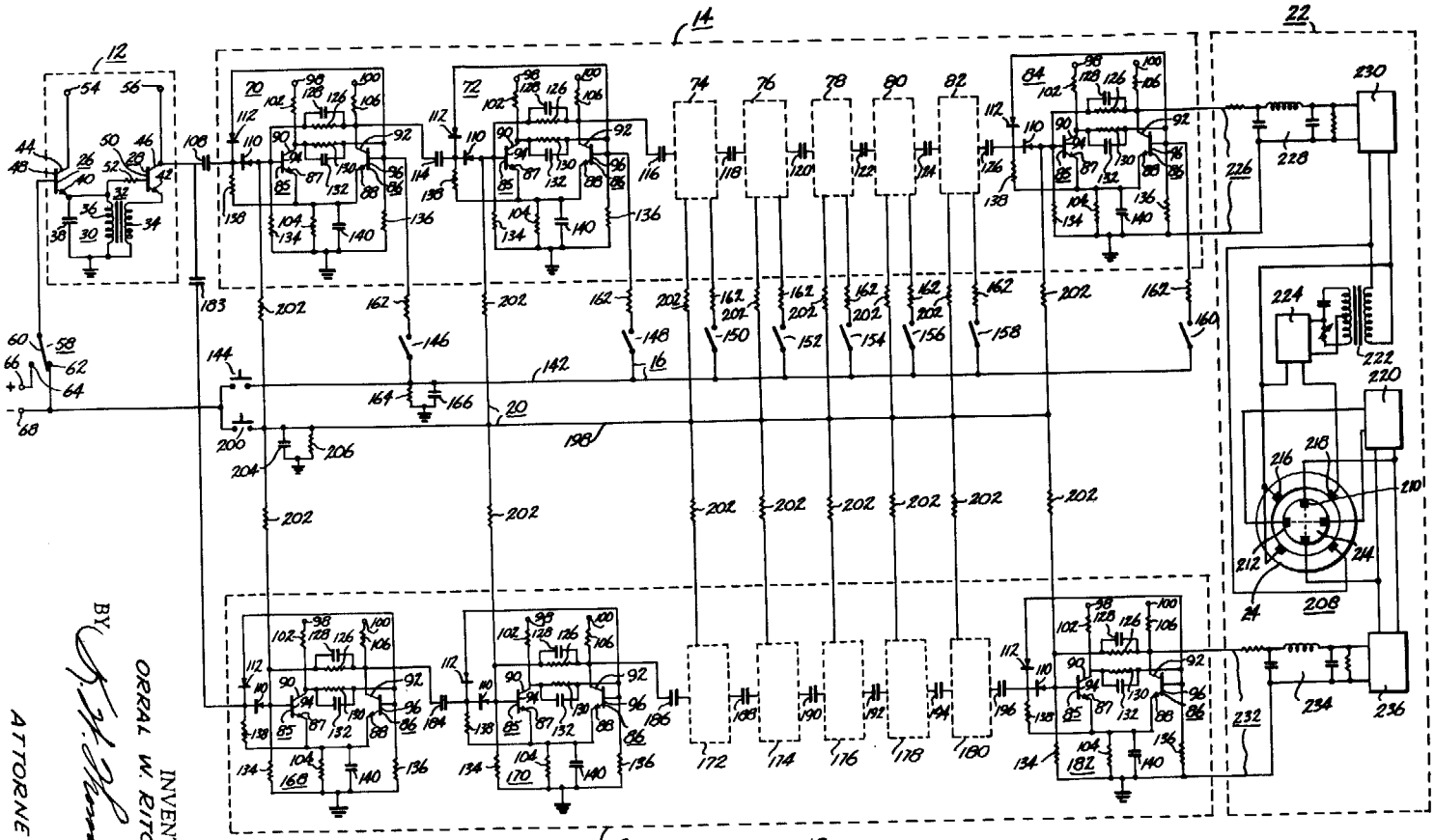

Matter enclosed in heavy brackets [ ] appears in the original patent but forms no part of this reissue specification; matter printed in italics indicates the additions made by reissue.

This invention relates to an electrical control system and more particularly to a digital-to-analog converter for converting digital information to a phase difference between two electrical waves.

Digital-to-analog converters have many applications. One such application is in the aircraft industry for effecting a control of the flight path of a missile in accordance with the ground to air transmission of digital information. In this application the digital information must be translated into a mechanical displacement of the airframe control surfaces. One prior art method of accomplishing this is to convert, by means of mechanical relays and a resistances network, the digital information to a direct-current analog voltage and then apply the voltage to a shaft angle position servo, thus converting the direct-current voltage to an analog shaft angle. However, this prior art converter has several disadvantages. For instance, in order to obtain the desired high speed of response for the converter, amplifiers must be provided to supply sufficient power to the numerous relays to effect rapid actuation of the relays. However, the addition of the amplifiers greatly increases the power consumption of the converter. Further, in this prior art converter the digital information is applied to the various relay stages and the output from the stages is summed and compared with a reference voltage to provide a control signal. In operation, this control signal varies in accordance with the digital information applied to the relay system. The variation in the magnitude of the control signal is very large and therefore in order to provide an accurate system, apparatus responsive to the control system should be linear over a wide range. Such apparatus is oftentimes difficult to obtain and then when it can be obtained it is designed to be overly large in order to provide the desired linearity. Further inaccuracy is introduced into this prior art converter by the reference voltage which cannot be maintained absolutely constant.

An object of this invention is to provide a new and improved electrical control system.

Another object of this invention is to provide for increasing the accuracy of a digital-to-analog converter by converting the digital information to a phase difference between two electrical waves.

A further object of this invention is to provide for minimizing the power consumption of a digital-to-analog converter and yet provide the desired high speed of response by controlling a mechanically static type of reference count-down counter and a mechanically static type of information binary counter from a common source of alternating voltage to thus produce output waves from the two counters, the phase difference between which varies in accordance with the digital information previously supplied to the information binary counter.

Still another object of this invention is to provide for increasing the reliability of a digital-to-analog converter to thus minimize maintenance problems.

Other objects of this invention will become apparent from the following description when taken in conjunction with the accompanying drawing wherein:

FIG. 1 is a diagrammatic illustration of apparatus and circuits embodying this invention; and FIGS. 2–6 are waveform timing diagrams useful in illustrating the operation of the invention.

Referring to the drawing there is illustrated a digital-to-anlog converter 10 embodying the teachings of this invention. In general, the digtal-to-analog converter 10 comprises an oscillator 12; an information binary counter 14 having an input and an output, the input of the information binary counter 14 being connected to be responsive to the output from the oscillator 12; circuit means 16 for applying digital information to the information binary counter 14; a reference binary counter 18 having an input and an output, the input of the reference binary counter 18 being connected to be responsive to the output from the oscillator 12; reset circuit means 20 for effecting a reset of the information binary counter 14 and a reset of the reference binary counter 18; to thus produce a voltage of rectangular wave shape at the output of the information binary counter 14 and at the output of the reference binary counter 18 the phase difference between which varies in accordance with the digital information applied to the information binary counter 14; and phase-sensitive control means 22 connected to be responsive to the output voltages from the information binary counter 14 and the reference binary counter 18, to thereby vary the angular position of a rotor 24, of the phase-sensitive control means 22, in accordance with the digital information applied to the information binary counter 14.

The oscillator 12 is a conventional oscillator and comprises two n–p–n junction type transistors 26 and 28, and a tank circuit 30. In operation, both of the transistors 26 and 28 are operated in a switching mode. As illustrated, the tank circuit 30 comprises a transformer 32 having a primary winding 34 and a secondary winding 36, there being a capacitor 38 connected in parallel circuit relationship with the secondary winding 36. Transistors 26 and 28 comprise emitter electrodes 40 and 42, respectively, collector electrodes 44 and 46, respectively, and base electrodes 48 and 50, respectively.

In order to provide a bias between the emitter electrode 42, of the transistor 28, and the base electrode 50, a circuit including the primary winding 34, of the transformer 32, the secondary winding 36, and a current-limiting resistor 52, is interconnected between the emitter electrode 42 and the base electrode 50. In practice, the positive terminal of a source (not shown) of direct-current voltage is connected to terminals 54 and 56. The on-off operation of the oscillator 12 is controlled by the transistor 26 in cooperation with a switch 58 which has a movable contact 60 which is disposed to be selectively actuated into engagement with either a stationary contact 62 or a stationary contact 64. The stationary contact 64 is electrically connected to a terminal 66 and the stationary contact 62 is electrically connected to a terminal 68. A source (not shown) of direct-current voltage is connected to the terminals 66 and 68, the positive side of the source (not shown) being connected to the terminal 66 and the negative side of the source (not shown) being connected to the terminal 68.

The operation of the oscillator 12 will now be described. With the movable contact 60, of the switch 58, positioned as shown in the drawings leakage current flows from the terminal 56 through the collector electrode 46, of the transistor 28, the emitter electrode 42, and the primary winding 34, of the transformer 32, to ground. The leakage current flowing through the primary winding 34 effects an induced voltage across the secondary winding 36 of such polarity as to render the transistor 28 conductive, however, once the current flow through the transistor 28 reaches a maximum there is substantially no change in the current flow through the primary winding 34 and thus there is substantially no voltage induced across the secondary winding 36. Therefore, the transistor 28 becomes non-conductive. The cycle is repeated to effect further oscillations.

When the movable contact 60, of the switch 58, is actuated into engagement with the stationary contact 64 a control voltage of such polarity is applied to the transistor 26 as to render it conductive. When the transistor 26 is rendered conductive current flows from the terminal 54 through the collector electrode 44, of the transistor 26, the emitter electrode 40, and the parallel circuit including the capacitor 38, and the secondary winding 36, to ground. This reduces the Q of the tank circuit 30 thus cutting the oscillator 12 off.

The information binary counter 14 will now be described. In this instance, the information binary counter 14 comprises eight stages of transistorized flip-flops 70, 72, 74, 76, 78, 80, 82 and 84 which are connected in a series count-down connection. Since each of the flip-flops 70, 72, 74, 76, 78, 80, 82 and 84 are identical only the flip-flop 70 will be described and the same reference characters will be used for the corresponding components of the flip-flops 72, 74, 76, 78, 80, 82 and 84.

The flip-flop 70 is a conventional flip-flop of the transistor type and comprises two n-p-n junction type transistors 85 and 86 having emitter electrodes 87 and 88, respectively, collector electrodes 90 and 92, respectively, and base electrodes 94 and 96, respectively. Load current for the transistors 85 and 86 is supplied from a source (not shown) of direct-current voltage which has its positive side connected to terminals 98 and 100. Specifically, the load circuit for the transistor 85 extends from the terminal 98 through a load resistor 102, the collector electrode 90, of the transistor 85, the emitter electrode 87, and a bias resistor 104, to ground. On the other hand, the load circuit for the transistor 86 extends from the terminal 100 through a load resistor 106, the collector electrode 92, of the transistor 86, the emitter electrode 88, and the bias resistor 104, to ground. By varying the magnitude of the resistance of the resistors 102 and 106 the amplitude of the output from the flip-flop 70 can be changed.

A control current for effecting a switching operation of either the transistor 85 or the transistor 86, of the flip-flop 70, is received from the output of the oscillator 12. Specifically, the collector electrode 46, of the transistor 28, is connected to the base electrode 94, of the transistor 85, through a capacitor 108 and a blocking rectifier 110. The control circuit is completed by the connection from the emitter electrode 87 to ground through the bias resistor 104. In like manner, the collector electrode 46, of the transistor 28, is connected to the base electrode 96, of the transistor 86, through the capacitor 108 and a blocking rectifier 112, the control circuit being completed by the connection from the emitter electrode 88 to ground through the bias resistor 104. In operation, the capacitor 108 provides direct current isolation between the oscillator 12 and the flip-flop 70. Like capacitors 114, 116, 118, 120, 122, 124 and 126 are provided to obtain direct current isolation between the flip-flops 70 and 72, the flip-flops 72 and 74, the flip-flops 74 and 76, the flip-flops 76 and 78, the flip-flops 78 and 80, the flip-flops 80 and 82, and the flip-flops 82 and 84, respectively. The blocking rectifiers 110 and 112, of the flip-flop 70, in turn function to prevent the positive portions of the alternating output voltage from the oscillator 12 from being applied to the base electrodes 94 and 96, respectively. Thus, only the negative portions of the alternating output voltage of the oscillator 12 are applied to the base electrodes 94 and 96.

In order to render the transistor 85, of the flip-flop 70 conductive when the transistor 86 is rendered non-conductive and in order to maintain the transistor 85 non-conductive when the transistor 86 is conductive, circuit means, including a current-limiting resistor 126 and a capacitor 128, is interconnected between the collector electrode 92, of the transistor 86, and the base electrode 94, of the transistor 85. The parallel circuit, including the current limiting resistor 126 and the capacitor 128, functions to limit the magnitude of the control current to the transistor 85 to a safe value and yet owing to the capacitor 128 permits transient changes occurring at the collector electrode 92, of the transistor 86, to be rapidly applied to the base electrode 94, thus improving the switching characteristics of the flip-flop 70.

By interconnecting a parallel circuit, including a current-limiting resistor 130 and a capacitor 132, between the collector electrode 90, of the transistor 85, and the base electrode 96, of the transistor 86, the transistor 86 is rendered conductive when the transistor 85 is rendered non-conductive and the transistor 86 is maintained non-conductive when the transistor 85 is conductive. The parallel circuit, including the current-limiting resistor 130 and the capacitor 132, limits the magnitude of the control current to the transistor 86 to a safe value to prevent damage thereto and at the same time permits transient changes in the voltage at the collector 90, of the transistor 85, to be rapidly applied to the base electrode 96, of the transistor 86, to thus further improve the switching characteristics of the flip-flop 70.

To make certain that the transistor 85 is more fully in the non-conducting state when the transistor 86 is conductive, a resistor 134 is interconnected between ground and the base electrode 94, of the transistor 85. By providing the resistor 134 and interconnecting it as shown the emitter electrode 87, of the transistor 85, is rendered positive with respect to the base electrode 94 when the transistor 86 is conductive. Similarly, a resistor 136 is interconnected between ground and the base electrode 96, of the transistor 86, in order to render the transistor 86 more fully in the non-conducting state when the transistor 85 is conductive. Under these conditions of operation the resistor 136 renders the emitter electrode 88, of the transistor 86, positive with respect to the base electrode 96. A proper bias for the base electrode 94, of the transistor 85, is obtained by interconnecting a resistor 138 between the emitter electrode 87 and the junction point of the blocking rectifiers 110 and 112.

For the purpose of minimizing switching transients a capacitor 140 is interconnected between ground and the junction point of the emitter electrodes 87 and 88 of the transistors 85 and 86, respectively.

The circuit means 16 for applying digital information to the information binary counter 14 comprises a shift bus 142, a pushbutton switch 144, and a plurality of switches 146, 148, 150, 152, 154, 156, 158 and 160. As illustrated, the shift bus 142 is disposed to be electrically connected to the terminal 68 by means of the pushbutton switch 144. The switch 146 is connected in series circuit relationship with an impedance member, specifically a resistor 162, one end of the series circuit being connected to the shift bus 142 and the other end of the series being connected to the base electrode 96, of the transistor 86. In practice, the resistor 162 has a relatively high resistance value in order to prevent the negative output pulses from the oscillator 12 from reaching the shift bus 142. The corresponding resistors associated with the other flip-flops 72, 74, 76, 78, 80, 82 and 84 have been given the same reference character since they perform substantially the same function relative to their respective flip-flops. For instance, the resistor 162 associated with the flip-flop 72 functions to prevent the negative pulse appearing at the base electrode 96, of the transistor 86, from appearing on the shift bus 142. To further insure that transients do not appear on the shift bus 142 a by-pass circuit including a resistor 164 and a capacitor 166 is provided.

The reference binary counter 18 comprises eight stages of flip-flops 168, 170, 172, 174, 176, 178, 180 and 182 which are connected in a series count-down connection. Since the flip-flops of the binary counter 18 are identical to the flip-flops of the information binary counter 14 the components of the flip-flops of the reference binary counter 18 have been given the same reference characters as the corresponding components of the flip-flops of the information binary counter 14. For the purpose of providing direct current isolation between the oscillator 12 and the flip-flop 168, a capacitor 183 is interconnected between the collector electrode 46 and the base electrode 94, of the flip-flop 168. Capacitors 184, 186, 188, 190, 192, 194 and 196 are provided in order to obtain direct current isolation between the various stages of flip-flops 168, 170, 172, 174, 176, 178, 180 and 182.

The circuit means 20 for effecting a reset of the flip-flops 70, 72, 74, 76, 78, 80, 82 and 84, of the information binary counter 14, and a reset of the flip-flops 168, 170, 172, 174, 176, 178, 180 and 182, of the reference binary counter 18, comprises a reset bus 198, and a pushbutton switch 200. As shown, the reset bus 198 is disposed to be electrically connected to the terminal 68 by means of the pushbutton switch 200. The base electrode 94, of the transistor 85, of each of the flip-flops of the information binary counter 14 and of the reference binary counter 18 is electrically connected to the reset bus 198 by means of an impedance member, specifically a resistor 202. In practice, the resistance value of the resistor 202 is high in order to prevent the negative pulse appearing at the base electrode 94, of the transistor 85, from appearing on the reset bus 198. Transient voltages are further prevented from appearing on the reset bus 198 by the by-pass circuit, including a capacitor 204 and a resistor 206.

The phase-sensitive control means 22, comprises a phase-angle transducer 208, together with associated filter circuits 228 and 234, phase shift circuits 220 and 222, and alternating-current amplifiers 224, 230 and 236. Electro-mechanical transducers responsive to the phase displacement between a plurality of alternating electrical quantities are widely employed, one of the most common usages being power factor measurement. Meters for power factor measurement are illustrated and discussed in various books on electrical measuring instruments. See, for example, Electrical Measurements by F. A. Laws, 1917 edition, pp. 532 to 535, published by McGraw-Hill Book Company, New York City.

Such prior art devices usually consist of a stator assembly, employed together with a rotor assembly which is mounted for rotation with respect to the stator assembly. One of these assemblies includes a poly-phase coil assembly for producing a rotating magnetic field. Such a field may be produced by mounting two coils at right angles to each other and energizing these coils by electrical currents which differ in phase by 90 electrical degrees.

In prior art devices of the above type, the poly-phase coil assembly for producing the rotating magnetic field is commonly included in the rotor assembly, and a single-phase coil assembly is used as the stator. When a prior art phase-angle measuring device of the foregoing type has the rotor and stator assembly energized respectively in accordance with two alternating voltages having the same frequency but differing in phase angles, the rotor assembly is urged towards a rest position relative to the stator assembly, wherein the resultant torque applied to the rotor assembly approaches zero. This rest position varies in accordance with the magnitude of the phase displacement between the two alternating voltages.

The phase-angle transducer 208 used in the apparatus described herein is similar to the prior art devices described about, but employs an additional stator winding 212 disposed, on the stator 214, at right angles to stator winding 210. This additional winding 212, is energized through the phase shift circuit 220, by an electrical current which is shifted in phase by 90 electrical degrees from that applied to the stator winding 210. The addition of this stator winding 212 doubles the torque available at the phase-angle transducer rotor shaft or pointer (not shown). Errors which would be caused by frequent shift of the oscillator 12 are also reduced, as will be explained hereinafter.

The rotor 24 includes two rotor windings 216 and 218 which are disposed at right angles to one another. The phase shift circuit 222 is connected so that the rotor winding 218 is supplied with a current which is 90° out of phase with the current passing through the rotor winding 216. Amplification of the alternating voltage applied to the rotor winding 218 is obtained by means of an alternating-current amplifier 224.

Circuit means 226 is provided for rendering the rotor winding 216, of the phase-angle transducer 208, responsive to the output information from the binary counter 14. The circuit means 226 includes the low pass pi-type filter 228 which functions to convert the rectangular wave shape voltage output from the flip-flop 84 to a substantially pure sine wave, and the alternating-current amplifier 230 which amplifies the output from the low pass pi-type filter 228.

The stator winding 210 is rendered responsive to the output from the flip-flop 182, of the reference binary counter 18, by means of a circuit 232. The circuit 232 includes the low pass pi-type filter 234 which functions to convert the rectangular wave shaped output voltage from the flip-flop 182 to a substantially pure sine wave, and the alternating-current amplifier 236 which amplifies the output from the filter 234.

In operation, a resultant rotating magnetic field is produced by the current flow through the stator windings 210 and 212. A resultant rotating magnetic field is also produced by the current flow through the rotor winding 216 and 218. When there is a phase difference between these two rotating magnetic fields a torque is effected which causes rotation of the rotor 24 until the magnetic fields produced by the rotor 24 and the stator 214 are so aligned that the torque is minimized and the rotor 24 reaches the rest position. It will be seen that there are two dispositions of the magnetic fields at which the torque becomes zero. One of these torque nulls is unstable, however, and any slight perturbation of the transducer 208 will cause the rotor 24 to move until it reaches the stable null. There is therefore one, and only one, stable shaft position of the rotor 24 which corresponds to any given phase angle difference in the output voltages of the counters 14 and 18, and the shaft (not shown) of the rotor 24 will move to this position turning through an angle of not more than 180 degrees, regardless of the point at which motion may have begun. Therefore, any change in phase difference between the output voltages from the counters 14 and 18 causes a phase difference between the rotating magnetic fields produced by the current flow through the stator windings 210 and 212 and the rotor windings 216 and 218, to thus position the rotor 24 and its shaft (not shown) in accordance with the phase difference between the output voltages of the counters 14 and 18. The shaft position of the rotor 24 is therefore a measure of the phase difference between the output voltages of the counters 14 and 18.

In the event of a small shift in the frequency of the oscillator 12, a corresponding error in phase-angle will be produced in the phase shift circuit 222 supplying the phase-angle transducer rotor winding 218 causing a corresponding error in phase-angle indication. A similar error will be produced, however, in phase shift circuit 220 supplying the additional stator winding 212. For small angles, these errors tend to cancel, making the accuracy of the phase-angle transducer 208 less dependent on the frequency of the oscillator 12 than conventional devices having only one stator winding.

The operation of the digital-to-analog converter 10 will now be described. The sequence in putting the converter 10 into operation is as follows: First the oscillator 12 is stopped. This is accomplished by actuating the movable contact 60, of the switch 58, into engagement with the stationary contact 64. With the movable contact 60 so positioned the base electrode 48, of the transistor 26, is rendered positive with respect to the emitter electrode 40, to thereby render the transistor 26 conductive.

The second step in the sequence of operation is to effect an actuation of the pushbutton switch 200 to the circuit closed position to thereby effect a resetting of each of the flip-flops of the information binary counter 14 and the reference binary counter 18. Specifically, with the pushbutton switch 200 in the circuit closed position the base electrode 94 of each of the flip-flops of the information binary counter 14 and the reference binary counter 18 is electrically connected to the terminal 68. This renders the base electrode 94 negative with respect to its associated emitter 87 and thus the transistor 85 of each of the flip-flops is rendered non-conductive. When the transistor 85 of each of the flip-flops shown in the drawing is rendered non-conductive its associated transistor 86 is rendered conductive. The reason for this is that when the transistor 85 is rendered non-conductive the junction point between the collector electrode 90, of the transisor 85, and the load resistor 102 increases in positive potential to thereby render the base electrode 96, of the transistor 86, positive with respect to its associated emitter electrode 88, to thus render the transistor 86 conductive. Thus, in the reset condition the transistor 86 of each of the flip-flops of the information binary counter 14 and the reference binary counter 18 are in the conductive state and the associated transistor 85 is in the non-conductive state.

The third step in the sequence of operation of the digital-to-analog converter 10 is to apply the digital information to the information binary counter 14. This is effected by first actuating a predetermined number of the switches 146, 148, 150, 152, 154, 156, 158 and 160 to the circuit closed position and then actuating the pushbutton switch 144 to the circuit closed position. The switches 146, 148, 150, 152, 154, 156, 158 and 160 can be operated manually to determine the input control information to the information binary counter 14. However, although no part of this invention the input control information to the counter 14 could be supplied from a remote location. For instance, information which has been digitally coded for a particular position of the shaft (not shown) of the rotor 24 could be transmitted from a remote location to decoding apparatus the output from which would control the operation of the switches 146, 148, 150, 152, 154, 156, 158 and 160. For purposes of illustration we will assume that the switches 146 and 148 and 160 are actuated to the circuit closed position. Such information is designated 11000001. Under such circumstances the flip-flops 70, 72 and 84, of the information binary counter 14, are in a one condition and the flip-flops 74, 76, 78, 80 and 82 are in a zero condition. Of course, all of the flip-flops of the reference binary counter 18 are in the zero condition.

The fourth step in the sequence of operation of the digital-to-analog converter 10, is to start the oscillator 12. To effect this the movable contact 60, of the switch 58, is actuated into contact with the stationary contact 62 to thereby electrically connect the base electrode 48 of the transistor 26, to the terminal 68. With the movable contact 60 so positioned the base electrode 48, of the transistor 26, is negative with respect to its associated emitter electrode 40 and thus the transistor 26 is rendered non-conductive, to thus produce an output from the oscillator 12.

Before discussing a step-by-step operation of the information binary counter 14 after information has been applied to the counter 14 a brief description will be given of the case in which no information has been applied to the information binary counter 14. Under the latter conditions each of the flip-flops of the information binary counter 14 and the reference binary counter 18 is in the zero condition. When the flip-flops of the digital-to-analog converter 10 are in this state the first stage or flip-flop of each of the counters 14 and 18 changes state for each cycle of output voltage from the oscillator 12. On the other hand, the second stage of each of the counters 14 and 18 changes state for every two cycles of output voltage from the oscillator 12, the third stage for every four cycles of output voltage from the oscillator 12, the fourth stage for every eight cycles of output voltage from the oscillator 12, the fifth stage for every sixteen cycles of output voltage from the oscillator 12, the sixth stage for every thirty-two cycles of output voltage from the oscillator 12, the seventh stage for every sixty-four cycles of output voltage from the oscillator 12, and the final stage for every one hundred twenty-eight cycles of output voltage from the oscillator 12. Therefore, if the digital information applied to the information binary counter 14 is 00000001, in which only the switch 160 is in the circuit closed position, then the phase difference between the rectangular wave shaped output voltage from the information binary counter 14 and from the reference binary counter 18 will be one-half of a cycle or 180°. However, if only the switch 158, is in the circuit closed position then the phase difference between the output voltages from the counters 14 and 18 will be one quarter of a cycle or 90°. It is therefore possible to have 256 discrete phase differences between the voltage outputs from the counters 14 and 18.

The foregoing action of the circuit of the present invention to produce phase difference in accordance with binary information may be shown by a consideration of the waveforms shown in FIGS. 2 through 6. These curves illustrate the operation of a circuit comprising an information binary counter and a reference binary counter, each having four stages. The operation demonstrated by these waveforms is identical with that which follows from the circuit in FIG. 1 except that only four stages instead of eight stages for the counters are shown. This operation corresponds to coupling the output of oscillator 12 to the input of the flip-flop 78 in counter 14 and to the input of the flip-flop 176 in counter 18, the first four stages in each counter being omitted for convenience in order to shorten the illustration. It is assumed that both counters are reset to the zero condition. For a circuit of this type, as previously explained, the output of oscillator 12 indicated at FIG. 2a causes a change of state of the first flip-flop stages in response to each cycle of the oscillator signal as indicated at FIG. 2b. The subsequent flip-flop stages count by a scale of two as indicated in FIGS. 2c, 2d and 2e. It is reiterated that FIG. 2e represents the output of the final stage of a four stage information binary counter 14 when reset to zero with all the switches 154, 156, 158 and 160 opened initially. For such conditions the output of channel 14 is identical to the output of channel 18. FIG. 3 shows the output of the last stage 182 of the reference binary counter 18 which may be observed as being the same as last stage 84 of the information binary counter 14 shown in FIG. 2e. These waves after passing through respective filters 228 and 234 produce substantially sinusoidal voltage waveforms with zero phase displacement therebetween for operating the phase angle transducer 208.

As previously indicated the closure of switch 160 produces a 180° phase displacement of the output of the information binary counter 14 relative to the output of the reference binary counter 18. This phase difference may be observed by comparing FIG. 3 which represents the output signal of stage 182 of the reference binary counter 18 with FIG. 4 which represents the output of stage 84 of the information binary counter 14 resulting from a closure of switch 160 and a momentary closure of switch 144. Note that the information wave in FIG. 4 is 180° out of phase with the reference wave in FIG. 3. This phase reversal follows because the closure of switch 160 and switch 144 change the state of flip-flop 84 opposite to that which it normally has when reset with the switch 160 open. It is seen therefore that the first signal change reaching the flip-flop 84 changes its state opposite to that of flip-flop 182, rendering the two signals 180° out of phase.

Smaller increments of phase shift are obtained by closing switches preceding switch 160 and the momentary closure of switch 144 in the information channel. The effect of closing switch 158 is indicated in FIG. 5 wherein the binary number 0010 in the information binary counter 14 corresponds to the closure of switch 158. The closure of the switch 158 changes the state of flip-flop 82 as indicated in FIG. 5a in comparison to the normal condition indicated in FIG. 2d. Accordingly, the change which results in the flip-flop 84 as the result of the changed stage of the flip-flop 82 is indicated in FIG. 5b. In comparison to FIG. 3, FIG. 5b is seen to be at a 90° phase relation thereto.

A still smaller increment of phase shift is obtained by closing switch 156 and depressing switch 144 which corresponds with setting the binary number 0100 in the information binary counter 14. The closure of switch 156 changes the state of flip-flop 80 as indicated in FIG. 6a in comparison with the normal state indicated in FIG. 2c. The effect of the change of state of flip-flop 80 on the flip-flop 82 is shown in FIG. 6b, and the effect of this change of the flip-flop 82 on the flip-flop 84 is shown in FIG. 6c. A comparison of FIG. 6c with FIG. 3 shows that a phase displacement of 45° has been effected due to the closure of the switch 156.

The operation of the eight stage counters shown in FIG. 1 proceeds exactly as indicated with reference to the abbreviated version described above in connection with FIG. 2 through 6. In each instance smaller increments of phase shift may be added by closing switches 152, 150, 148 or 156 successively in the information binary counter 14 and setting switch 144. By combining closures of various ones of the switches any desired combination of phase shift increments may be secured between the outputs of the binary counters 14 and 18 with the resolution limited only by the total number of flip-flop stages employed.

Let us now consider what takes place when the flip-flops of the counters 14 and 18 have been reset and the switches 146, 148 and 160 are in the circuit closed position and the switches 150, 152, 154, 156 and 158 are in the circuit open position. Under these circumstances, the first cycle of output voltage from the oscillator 12 renders the transistor 85, of the flip-flop 70, non-conductive and the transistor 86, of the flip-flop 70 conductive. When the transistor 86 of the flip-flop 70, is rendered conductive the collector electrode 92, of the flip-flop 70, becomes more negative and thus a negative pulse is applied to the base electrode 94, of the flip-flop 72, to thereby render the transistor 85, of the flip-flop 72, non-conductive and its associated transistor 86 conductive. Once the transistor 86, of the flip-flop 72, becomes conductive the collector 92, of the flip-flop 72, becomes more negative and thus a negative pulse is applied to the base electrode 96, of the flip-flop 74, to thereby render the transistor 86, of the flip-flop 74, non-conductive, and its associated transistor 85 conductive. When the transistor 86, of the flip-flop 74 becomes non-conductive the collector electrode 92, of the flip-flop 74, becomes more positive and a positive pulse is applied to the flip-flop 76. However, the blocking rectifiers 110 and 112 of the flip-flop 76, block this positive pulse and the flip-flop 76 does not change its bistable state. Since the flip-flop 76 does not change its bistable state, the flip-flops 78, 80, 82 and 84 likewise do not change their bistable state.

During the second cycle of voltage output from the oscillator 12 a negative pulse is applied to the base electrode 96, of the flip-flop 70, to thus render the transistor 86, of the flip-flop 70, non-conductive and its associated transistor 85 conductive. The rendering of the transistor 86, of the flip-flop 70, non-conductive increases the positive potential at the collector electrode 92, of the flip-flop 70, and thus a positive pulse is applied to the flip-flop 72. However, the blocking rectifiers 112 and 110, of the flip-flop 72, block this positive pulse and the flip-flop 72 does not change its bistable state. Therefore, the flip-flops 74, 76, 78, 80, 82 and 84 likewise do not change their bistable state.

During the third cycle of voltage output from the oscillator 12 a negative pulse is applied to the base electrode 94, of the flip-flop 70, to thereby render the transistor 85 non-conductive and its associated transistor 86 conductive. When the transistor 86, of the flip-flop 70, becomes conductive the collector electrode 92, of the flip-flop 70, assumes a higher negative potential thus causing a negative pulse to be applied to the base electrode 96, of the flip-flop 72, to thus render the transistor 86, of the flip-flop 72, non-conductive and its associated transistor 85 conductive. This increases the positive potential at the collector electrode 92, of the flip-flop 72, thus effecting no change in the bistable state of the flip-flop 74. Since there is no change in the bistable state of the flip-flop 74 the succeeding flip-flops 76, 78, 80, 82 and 84 likewise do not change their bistable state.

The fourth cycle of output voltage from the oscillator 12 causes a negative pulse to be applied to the base electrode 96, of the flip-flop 70, to thereby render the transistor 86 non-conductive and its associated transistor 85 conductive. This increases the positive potential at the collector electrode 92, of the flip-flop 70, and thus the succeeding flip-flops 72, 74, 76, 78, 80, 82 and 84 do not change their bistable state. If this description of the sequence of operation of the information binary counter 14 were continued step-by-step it would be found that after 125 cycles of the output voltage from the oscillator 12 the flip-flop 84 would change its bistable state. After 253 cycles of output voltage from the oscillator 12 the flip-flop 84 would again change its bistable state and thus produce one cycle of output voltage from the information binary counter 14 for 256 cycles of output voltage from the oscillator 12. Since the switches 146, 148 and 160 were in the circuit closed position the output voltage from the information binary counter 14 will be 184.23° out of phase with the output voltage from the reference binary counter 18.

The reference binary counter 18 counts down simultaneously with the information binary counter 14. In particular, during the first cycle of output voltage from the oscillator 12 a negative pulse is applied to the base electrode 96, of the flip-flop 168, to thus render the transistor 86, of the flip-flop 168, non-conductive and its associated transistor 85 conductive. When the transistor 86, of the flip-flop 168, becomes non-conductive the collector electrode 92, of the flip-flop 168, assumes a higher positive potential and thus the succeeding flip-flops 170, 172, 174, 176, 178, 180 and 182 do not change their bistable state.

Sometime during the second cycle of the output voltage from the oscillator 12 a negative pulse is applied to the base electrode 94, of the flip-flop 168, to thereby render the transistor 85, of the flip-flop 168, non-conductive and its associated transistor 86 conductive. This increases the negative potential at the collector electrode 92, of the flip-flop 168, to thereby effect a negative pulse at the base electrode 96, of the flip-flop 170, to thus render the transistor 86, of the flip-flop 170, non-conductive and its associated transistor 85 conductive. Since the positive potential at the collector electrode 92, of the flip-flop 170, increases the succeeding stages of flip-flops 172, 174, 176, 178, 180 and 182 do not change their bistable state.

The third cycle of output voltage from the oscillator 12 causes a negative pulse to be applied to the base electrode 96, of the flip-flop 168, to thus render the transistor 86, of the flip-flop 168, non-conductive and its associated transistor 85 conductive. When the transistor 86, of the flip-flop 168, becomes non-conductive the collector electrode 92, of the flip-flop 168, assumes a higher positive potential and thus the succeeding flip-flops 170, 172, 174, 176, 178, 180 and 182 do not change their bistable state.

During the fourth cycle of the output voltage from the oscillator 12 a negative pulse is applied to the base electrode 94, of the flip-flop 168, to thereby render the transistor 85 non-conductive and its associated transistor 86 conductive. This increases the negative potential at the collector electrode 92, of the flip-flop 168, and thus a negative pulse is applied to the base electrode 94, of the flip-flop 170, to thereby render the transistor 85, of the flip-flop 170, non-conductive and its associated transistor 86 conductive. When the transistor 86, of the flip-flop 170, becomes conductive the negative potential at the collector electrode 92, of the flip-flop 170, increases to thereby effect a negative pulse at the base electrode 96, of the flip-flop 172, to thereby render the transistor 86, of the flip-flop 172, non-conductive and its associated transistor 85 conductive. Since the collector electrode 92, of the flip-flop 172, assumes a higher positive potential the succeeding flip-flops 174, 176, 178, 180 and 182 do not change their bistable state. A further description of the operation of the reference binary counter 18 would reveal that after 128 cycles of output voltage from the oscillator 12 the flip-flop 182 would change its bistable state. After 256 cycles of output voltage from the oscillator 12 the flip-flop 182 would again change its bistable state. Thus, there is one cycle of output voltage from the reference binary counter 18 for every 256 cycles of output voltage from the oscillator 12.

As hereinbefore mentioned, there is a phase difference under the assumed conditions between the output voltage from the information binary counter 14 and the output voltage from the reference binary counter 18, which phase difference varies in accordance with the digital information applied to the information binary counter 14. The phase-sensitive transducer 208 responds to this phase difference in the output voltages from the counters 14 and 18 and effects a change in the angular position of its rotor 24 in accordance with this phase difference.

Although a particular oscillator 12 has been shown in the drawing it is to be understood that other suitable types of oscillators could be substituted for the oscillator 12. Further, in a certain number of limited applications the oscillator 12 could be omitted and the counters 14 and 18 could be connected to a supply voltage of any selected frequency.

It is also to be understood that other suitable types of flip-flops could be substituted for the flip-flops shown in the drawing. It is further to be understood that by providing feed-back paths for either or both of the counters 14 and 18, or by providing cross feed-back between the counters 14 and 18 the phase difference information could be programmed. Thus this invention is not limited to digital-to-analog converters.

It is also to be understood that a suitable counter could be substituted for the reference binary counter 18 provided that it produced a count-down of 256. For instance, it could count down by fours instead of twos as does a binary counter. It is further to be understood that any suitable phase shift measuring means could be employed as a substitution for the phase-angle transducer 208 shown on the drawing. Such measuring means might include conventional phase meters or power factor meters, servo type phase measuring devices, electronic phase-angle comparators, or any other means suitable for measuring the difference in phase angle of two electrical signals.

The apparatus embodying the teachings of this invention has several advantages. For instance, the apparatus embodying the teachings of this invention has a high accuracy. In addition, the digital-to-analog converter 10 has a minimum of power consumption and yet provides the desired high speed of response. Further, the apparatus embodying the teachings of this invention is highly reliable and requires a minimum of maintenance.

Since certain changes may be made in the above described apparatus and circuits and different embodiments of the invention may be made without departing from the spirit and scope thereof, it is intended that all matter contained in the above description or shown in the accompanying drawing shall be interpreted as illustrative and not in a limiting sense.

I claim as my invention:

[1. In an electrical control system adapted to be connected to a source of alternating voltage, the combination comprising, an information binary counter having an input and an output, the input of the information binary counter being adapted to be connected to the source of alternating voltage, circuit means for applying digital information to the information binary counter, a reference counter having an input and an output, the input of the reference counter being adapted to be connected to the source of alternating voltage, to thus produce an electrical wave at the output of each of said counters the phase difference between which varies in accordance with the digital information applied to the information binary counter, and phase-sensitive control means connected to be responsive to the output from each of said counters.]

[2. In an electrical control system, the combination comprising, an oscillator, an information binary counter having an input and an output, the input of the information binary counter being connected to be responsive to the oscillator, circuit means for applying digital information to the information binary counter, a reference counter having an input and an output, the input of the reference counter being connected to be responsive to the oscillator, to thus produce an electrical wave at the output of each of said counters the phase difference between which varies in accordance with the digital information applied to the information binary counter, and phase-sensitive control means connected to be responsive to the output from each of said counters.]

[3. In an electrical control system, the combination comprising, an oscillator, an information binary counter having an input and an output and including a plurality of flip-flops connected in a series count-down connection, the input of the information binary counter being connected to be responsive to the oscillator, circuit means connected to the plurality of flip-flops for applying digital information to the plurality of flip-flops, a reference counter having an input and an output and including a plurality of flip-flops connected in series count-down connection, the input of the reference counter being connected to be responsive to the oscillator, to thus produce an electrical wave at the output of each of said counters the phase difference between which varies in accordance with the digital information applied to the information binary counter, and phase sensitive control means connected to be responsive to the output from each of said counters.]

4. In an electrical control system, the combination comprising, an oscillator, an information binary counter having an input and an output and including a plurality of transistorized flip-flops connected in a series count-down connection, the input of the information binary counter being connected to be responsive to the oscillator, circuit means connected to the plurality of transistorized flip-flops for applying digital information to the plurality of transistorized flip-flops, a reference counter having an input and an output and including a plurality of transistorized flip-flops connected in a series count-down connection, the input of the reference counter being connected to be responsive to the oscillator, to thus produce an electrical wave at the output of each of said counters the phase difference between which varies in accordance with the digital information applied to the information binary counter, other circuit means connected to the transistorized flip-flops of both of said counters to effect at resetting of each of said transistorized flip-flops, and phase sensitive control means connected to be responsive to the output from each of said counters.

5. In an electrical control system adapted to be connected to a source of alternating voltage, the combination comprising, an information binary counter having an input and an output, the input of the information binary counter being adapted to be connected to the source of alternating voltage, circuit means for applying digital information to the information binary counter, a reference counter having an input and an output, the input of the reference counter being adapted to be connected to the source of alternating voltage, to thus produce an electrical wave at the output of each of said counters the phase difference between which varies in accordance with the digital information applied to the information binary counter, and a phase angle transducer including two stator windings disposed on a stator, a rotor, two rotor windings carried by the rotor, other circuit means for exciting the two stator windings in accordance with the output from the reference counter, and further circuit means for exciting, the two rotor windings in accordance with the output from the information binary counter, to thereby vary the angular position of the rotor in accordance with the digital information applied to the information binary counter.

6. In a digital-to-analog converter, the combination comprising, an oscillator, an information binary counter having an input and an output, the input of the information binary counter being connected to be responsive to the oscillator, circuit means for applying digital information to the information binary counter, a reference counter having an input and an output, the input of the reference counter being connected to be responsive to the oscillator, to thus produce an electrical wave at the output of each of said counters the phase difference between which varies in accordance with the digital information applied to the information binary counter, and a phase angle transducer including two stator windings disposed on a stator, a rotor, two rotor windings carried by the rotor, other circuit means for rendering one of the two stator windings responsive to the output of the reference counter, further circuit means interconnected between the two stator windings, for exciting the other of the two stator windings with a voltage which is approximately ninety degrees out of phase with the voltage across said one of the two stator windings, still other circuit means for rendering one of the two rotor windings responsive to the output of the information binary counter, and still further circuit means, interconnected between the two rotor windings, for exciting the other of the two rotor windings with a voltage which is a predetermined number of degrees out of phase with the voltage across said one of the two rotor windings, to thereby vary the angular position of the rotor in accordance with the digital information applied to the information binary counter.

7. In a digital-to-analog converter, the combination comprising, an oscillator, an information binary counter having an input and an output and including a plurality of flip-flops connected in a series count-down connection, the input of the information binary counter being connected to be responsive to the oscillator, circuit means connected to the plurality of flip-flops for applying digital information to the plurality of flip-flops, a reference counter having an input and output and including a plurality of flip-flops connected in series count-down connection, the input of the reference counter being connected to the responsive to the oscillator, thus producing an electrical wave at the output of each of said counters the phase difference between which varies in accordance with the digital information applied to the information binary counter, a phase angle transducer including two stator windings disposed on a stator, a rotor, two rotor windings carried by the rotor, a filter interconnected between the output of the reference counter and one of the two stator windings, circuit means, interconnected between the two stator windings, for exciting the other of the two stator windings with a voltage which is approximately ninety degrees out of phase with the voltage across said one of the two stator windings, another filter interconnected between the output of the information binary counter and one of the two rotor windings, other circuit means, interconnected between the two rotor windings, for exciting the other of the two rotor windings with a voltage which is a predetermined number of degrees out of phase with the voltage across said one of the two rotor windings, to thereby vary the angular position of the rotor in accordance with the digital information applied to the information binary counter.

*8. A digital-to-analog converter comprising a counter having an input, an output and a succession of stages connected in series count-down relationship, means to apply a recurring waveform to the counter input thus to produce an electrical waveform in the counter output which is a frequency submultiple of the recurring waveform, and digital transfer means having a succession of elements respectively adapted to transmit electrical signals representing the digit place values of a number in a predetermined number system the scale of which corresponds to the frequency division ratio between at least certain successive counter stages, said successive elements being respectively connected to said certain counter stages, thereby to set such stages and thus shift the electrical phase of said electrical waveform by an amount related to the number represented, a phase reference device operatively associated with the first-mentioned means and operable thereby to produce an electrical waveform of the frequency of the counter output electrical waveform and of an electrical phasing which is independent of said number, and means sensitive to phase difference responsively connected to the output of both the counter and the phase reference device.*

*9. The converter defined in claim 8, and means operatively associated with the counter stages to reset the counter stages for establishing a predetermined initial phase condition of the counter output electrical waveform preliminary to operation of the digital transfer means.*

*10. A digitally controlled phase shift device comprising a counter having an input, an output and a succession of stages connected in series count-down relationship, means to apply a recurring waveform to the counter input thus to produce an electrical waveform in the counter output which is a frequency submultiple of the recurring waveform, and digital transfer means having a succession of elements respectively adapted to transmit electrical signals representing the digit place values of a number in a predetermined number system the scale of which corresponds to the frequency division ratio between at least certain successive counter stages, said successive elements being respectively connected to said certain counter stages, thereby to set such stages and thus shift the electrical phase of said electrical waveform by an amount related to the number represented.*

*11. The phase shift device defined in claim 10, and means operatively associated with the counter stages to reset the counter stages for establishing a predetermined initial phase condition of the counter output electrical waveform preliminary to operation of the digital transfer means.*

*12. A digitally controlled phase shift device comprising a counter having an input, an output and a succession of flip-flop stages connected in series count-down relationship, means to apply a recurring waveform to the counter input thus to produce an electrical waveform in the counter output which is a frequency submultiple of the recurring waveform, and binary digital transfer means having a succession of elements respectively connected to transmit electrical signals representing the digit place values of a binary number to successive counter stages, thereby to set such stages and thus shift the electrical phase of said electrical waveform by an amount related to the binary number represented.*

*13. A binary digital-to-analog converter comprising a counter having an input, an output and a succession of flip-flop stages connected in series count-down relationship, means to apply a recurring waveform to the counter input thus to produce an electrical waveform in the counter output which is a frequency submultiple of the recurring waveform, and binary digital transfer means having a succession of elements respectively connected to transmit electrical signals representing the digit place values of a binary number to successive counter stages, thereby to set such stages and thus shift the electrical phase of said electrical waveform by an amount related to the binary number represented, a phase reference device operatively associated with the first-mentioned means and operable thereby to produce an electrical waveform of the frequency of the counter output electrical waveform and of an electrical phasing which is independent of said number, and means sensitive to phase difference responsively connected to the output of both the counter and the phase reference device.*

References Cited in the file of this patent
or the original patent

UNITED STATES PATENTS 2,760,132 Pawley ---------- Aug. 21, 1956